Aug. 14, 1951  C. E. STREED  2,564,134
ANIMAL TRAP
Filed Dec. 11, 1946
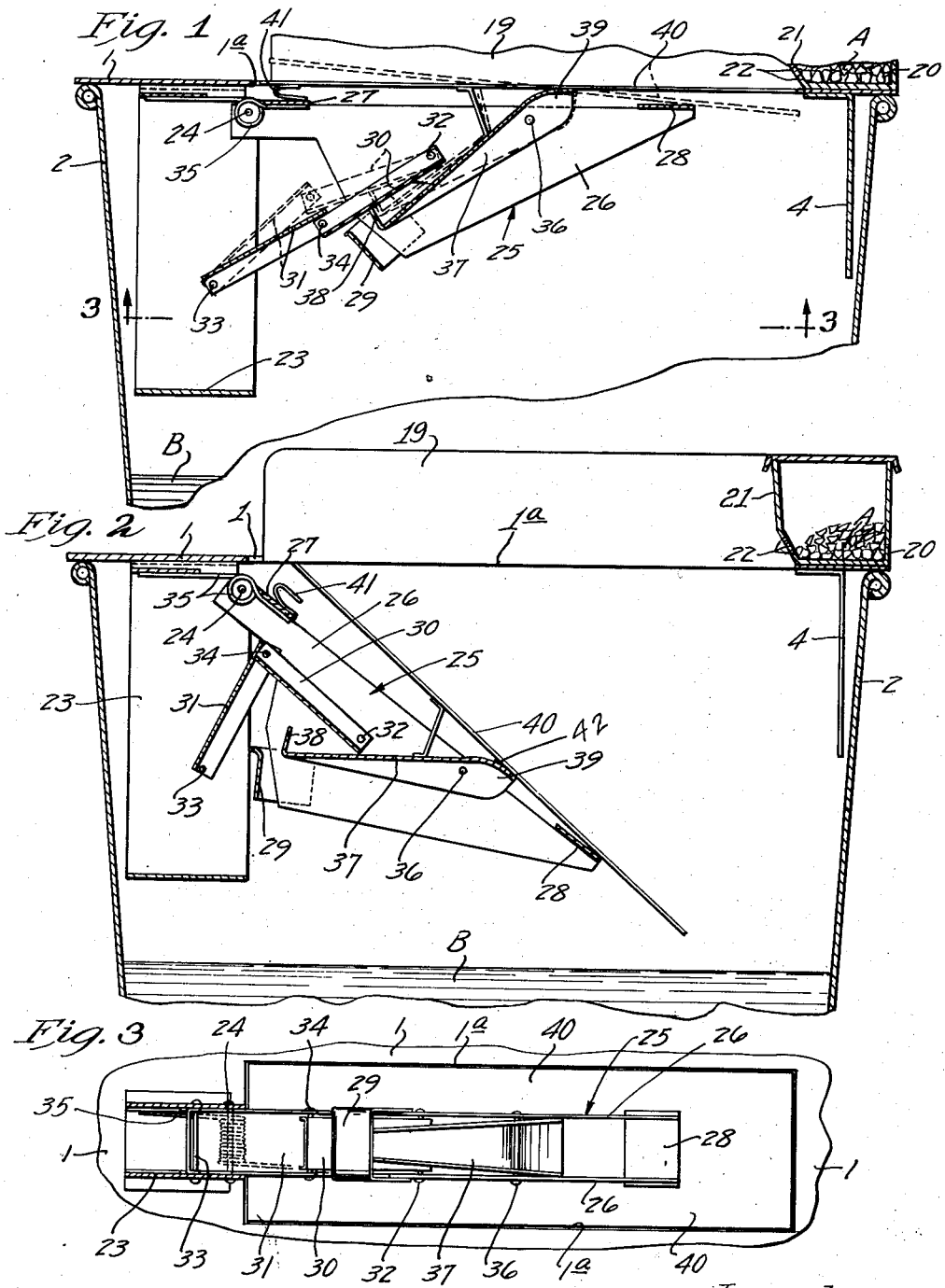
Inventor
Clifford E. Streed
By his Attorneys
Merchant & Merchant Patented Aug. 14, 1951

2,564,134

UNITED STATES PATENT OFFICE 2,564,134

ANIMAL TRAP

Clifford E. Streed, Minneapolis, Minn.

Application December 11, 1946, Serial No. 715,541

3 Claims. (Cl. 43—70)

My invention relates broadly to automatic loading-dumping devices and more specifically to devices of this type which are particularly adapted for use as animal traps.

The primary object of my invention is the provision of a device of the class immediately above described which is inexpensive to manufacture, rugged in construction, and relatively trouble-free in operation.

A still further object of my invention is the provision of an animal trap having an elongated vertically swinging runway which automatically releases its load when the load reaches a predetermined point thereon and which will automatically reset itself thereafter.

The above and still further objects of my invention will become apparent from the following detailed specification, appended claims, and attached drawings.

Referring to the drawings wherein like characters indicate like parts throughout the several views:

Fig. 1 is a vertical axial section of my invention, some parts being broken away;

Fig. 2 is a view corresponding to Fig. 1, but showing a different position of some of the parts; and Fig. 3 is a view taken on the line 3—3 of Fig. 1, some parts being shown in section and parts being shown in bottom plan.

Referring to the drawings, the numeral 1 indicates a base in the form of a cover plate having a rectangular opening 1a therein and adapted to be mounted on top of a pail or other receptacle 2. Secured to the base plate 1 and depending therefrom, adjacent one end of opening 1a, is a stationary support 23 in the form of a bracket. Diametrically opposed to the stationary support 23 is a depending flange 4 which, together with the support 23, limits the horizontal movements of the base plate 1 on the pail 2.

The stationary supporting bracket 23 depends from cover plate 1 adjacent one end of opening 1a and has pivoted thereto, as at 24, a swinging support 25. Swinging support 25 is made up of a pair of side members 26 joined by cross bars 27 and 28 and a stop member 29 adapted to engage the member 23. Toggle links 30 and 31 respectively are pivotally connected to swinging support 25 and the stationary support 23, as indicated at 32 and 33 respectively, and to each other as at 34. A torsion spring 35, carried by the pivot pin 24, has one end engaging the stationary support 23 and its other end engaging the cross member 27 of the swinging support 25 tending to bias the swinging member 25 toward a horizontal or full line position, as in Fig. 1. Pivotally secured to the side walls 26 of swinging member 25, at a point outwardly spaced from the pivot 32 as at 36, is a tripping lever 37. The lower end of tripping lever 37 is provided with an upturned toe 38 which is adapted to engage the toggle link 30 and to impart movement thereto away from the stop member 29. The upper end of tripping lever 37 projects above the plane of supporting member 25, as indicated at 39, and is there rigidly joined to the intermediate portion of an elongated runway 40 as at 42. A spacer 41 is secured to the cross member 27 of the swinging member 25 and retains the runway 40 in the same plane as the cover plate 1, until the weight on the runway 40 goes beyond the pivot axis 36 far enough to trip the toggles 30 and 31, so as to dump the load.

Secured to and projecting upwardly from the base member 1, one adjacent each side of the runway 40, are guide walls 19 one of which is shown in Figures 1 and 2. At the end of the track formed by this runway 40 and rigidly secured to the base 1, is a covered bait box 20. Preferably, and as shown, bait box 20 is provided with an inwardly sloping wall 21 immediately adjacent the free end of the runway 40. Wall 21 at its lower end, is provided with perforations 22 through which the aroma from the bait A therein, is adapted to exude.

While I have disclosed a preferred embodiment of my invention, it should be apparent that my invention is capable of further modifications, all within the scope of the appended claims.

What I claim is:

1. In a device of the class described, a stationary support, a swinging support pivoted at one of its ends to said stationary support on a horizontal axis, cooperating toggle links connecting said supports, said toggle links positioning said swinging support in a load supporting position when said links are in approximately dead center relationship, an elongated runway overlying said swinging support in spaced relation thereto, means on one of the supports stopping movements of the toggle links in one direction at a point beyond dead center, and a tripping lever pivotally secured to said swinging support, the lower end of said lever being adapted to engage one of the links of said toggle and move said toggle links in a direction away from said stop means, the upper end of said tripping lever projecting above the plane of said swinging support and being rigidly secured to the intermediate portion of said runway.

2. The structure defined in claim 1 in which the pivot axis of the tripping lever is spaced outwardly from said stationary support beyond the pivot axis of the toggle link in said swinging support.

3. In an animal trap, a base plate adapted to be positioned over an open container and having an elongated opening therein, a stationary support depending from said base plate adjacent one end of said opening, a swinging support pivoted at one of its ends to said stationary support on a horizontal axis, cooperating toggle links connecting said supports, said toggle links positioning said swinging support in a load supporting position when said links are in approximately dead center relationship, an elongated runway overlying said swinging support in spaced relationship thereto, means on one of the supports stopping movement of the toggle links in one direction at a point beyond dead center, a tripping lever pivotally secured to said swinging support, the lower end of said lever adapted to engage one of the links of the toggle and move said toggle links in a direction away from said stop means, the upper end of said tripping lever projecting above the plane of said swinging support and being rigidly secured to the intermediate portion of said runway, means biasing said toggle links toward dead center, guide means secured to said base plate adjacent the opposite longitudinal edges of said opening, and a bait container adjacent the end of said opening opposite said depending support.

CLIFFORD E. STREED.

REFERENCES CITED

The following references are of record in the file of this patent:

UNITED STATES PATENTS

| Number | Name | Date |
|---|---|---|
| 1,012,400 | McCombs | Dec. 19, 1911 |
| 1,982,870 | Howland | Dec. 4, 1934 |

FOREIGN PATENTS

| Number | Country | Date |
|---|---|---|
| 9,709 | Great Britain | of 1913 |